UNITED STATES PATENT OFFICE.

WILLIAM ADAMSON AND CHARLES F. A. SIMONIN, OF PHILADELPHIA, PA., ASSIGNORS TO WILLIAM ADAMSON, OF SAME PLACE.

IMPROVEMENT IN TREATING GRAIN FOR THE MANUFACTURE OF STARCH, SPIRITS, &c.

Specification forming part of Letters Patent No. 147,353, dated February 10, 1874; application filed November 28, 1873.

*To all whom it may concern:*

Be it known that we, WILLIAM ADAMSON and CHARLES F. A. SIMONIN, of the city and county of Philadelphia, State of Pennsylvania, have invented an Improvement in the Treatment of Grain, &c., for the Manufacture of Starch, Alcohol, &c., of which the following is a specification:

The object of our invention is to facilitate the conversion of grain or other farinaceous substances into starch of a superior quality as regards purity and color, or into alcohol comparatively free from fusel-oil; and this object we attain by treating the grain, &c., with hydrocarbon vapors under pressure, and thereby reducing it to a condition which induces rapid fermentation.

We take corn, grain, or farinaceous roots, nuts, or seeds, and place them either in a whole or crushed condition on a perforated diaphragm in a closed vessel containing a supply of hydrocarbon, by preference such as is of a volatile character—benzine, for instance, or benzole or gasoline—and this is vaporized by a steam-heated coil or otherwise. The vapor, under more or less pressure, passes upward and permeates the mass of grain, and soon deprives it of all resinous, gummy, and oily matter, which descends and finds a lodgment in the bottom of the vessel below the diaphragm, to be withdrawn from time to time, the vapor, after passing through the grain, being conducted to a cooler, and there condensed prior to being again introduced in a liquid form into the vessel. The grain thus deprived of the elements which impede fermentation may be removed from the vessel and be subjected to the fermenting process, the rapidity of which is increased owing to the absence of the above elements.

The fermented product may be converted by the usual process into starch of a superior quality as regards purity and color, owing to the removal from the grain of its coloring ingredients; or the fermented product may be converted by distillation into alcohol, which is more free from fusel-oil than ordinary alcohol, owing to the preliminary hydrocarbon treatment of the grain.

We are aware that bisulphide of carbon has been applied to grain for the purpose of extracting oily matter. We therefore disclaim the application of bisulphide of carbon and the application generally of liquid hydrocarbons directly to the grain, and restrict our claim to—

The process described of preparing grain and other farinaceous substances prior to fermentation and conversion into starch, alcohol, &c.—that is to say, subjecting the grain to hydrocarbon vapors under pressure, as set forth.

In testimony whereof we have signed our names to this specification in the presence of two subscribing witnesses.

WILLIAM ADAMSON.
CHS. F. A. SIMONIN.

Witnesses:
WM. A. STEEL,
J. SHERBORNE SINGER.